UNITED STATES PATENT OFFICE.

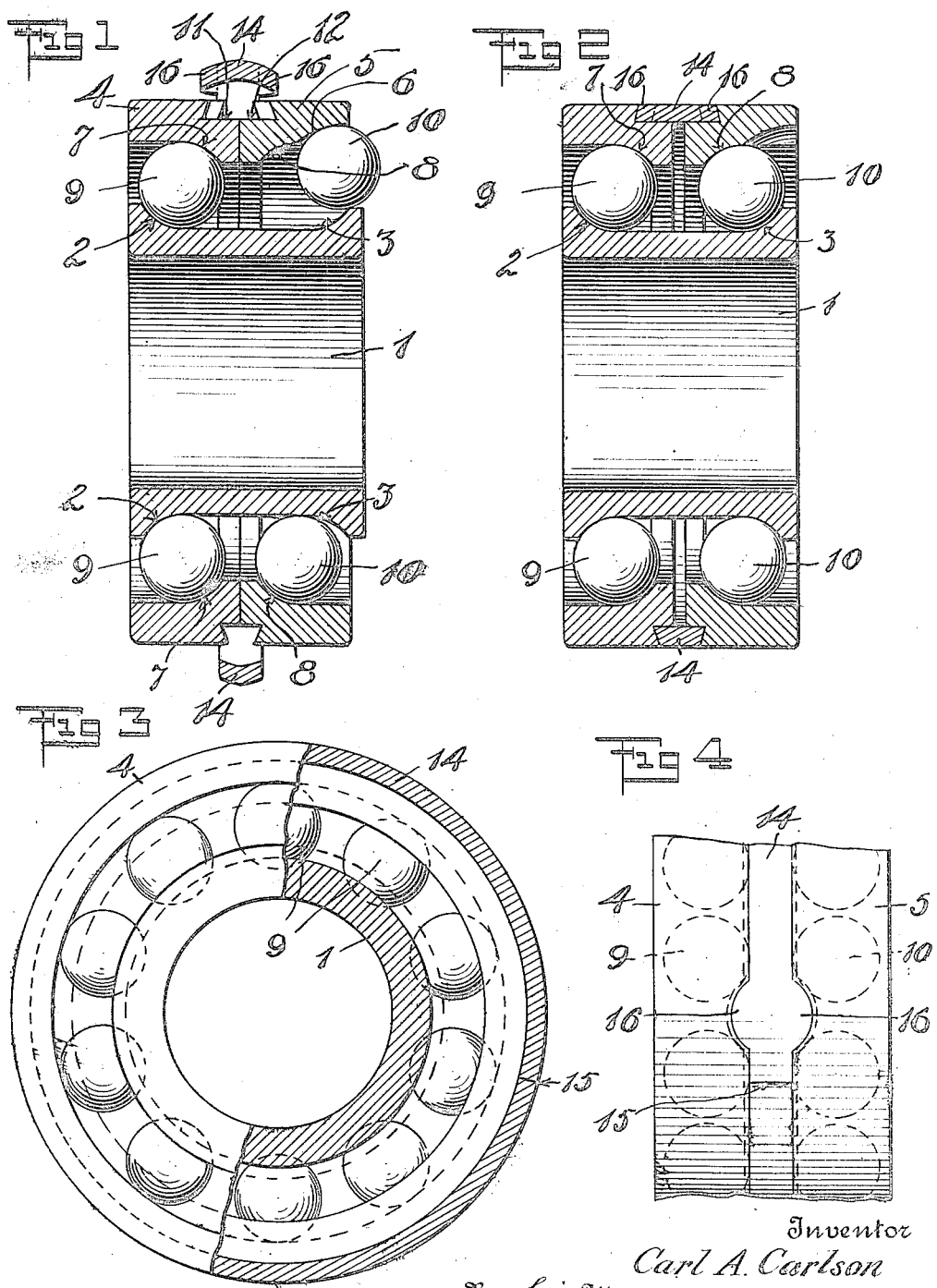

CARL A. CARLSON, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

BALL-BEARING.

1,222,846.  Specification of Letters Patent.  Patented Apr. 17, 1917.

Application filed January 15, 1917. Serial No. 142,353.

*To all whom it may concern:*

Be it known that I, CARL A. CARLSON, a citizen of the United States of America, residing at New Britain, Hartford county, Connecticut, have invented a new and useful Ball-Bearing, of which the following is a specification.

My invention relates to antifriction bearings and particularly to ball bearings of the double row type.

It is my object to provide a new and improved construction whereby the bearing may be easily assembled and whereby its durability and life may be substantially enhanced. These and various other advantages will appear to the mechanic skilled in the art from a reading of the following description and an examination of the accompanying drawing in which:

Figure 1, is a cross section of a bearing as the parts appear in the act of assembling.

Fig. 2, is a similar view of the finished bearing.

Fig. 3, is a side elevation partly in section of the complete bearing.

Fig. 4, is a view of the edge of the outer ring partly broken away.

1 represents an inner bearing ring which in this particular instance is provided with an annular channel to form two inwardly facing opposite shoulders which furnish respectively two spaced ball race-way tracks 2—3. The outer ring is made in two sections 4—5, each of which is provided with an annular shoulder to form ball race-way tracks indicated respectively at 7—8. 9—9 are balls of one series, which balls are arranged between the ball race-way tracks 2—7. 10—10 are balls of a second series which are arranged between the ball race-way tracks 3—8 when the bearing is assembled ready for use. The width of the outer ring members 4—5 is such that when brought together as shown in Fig. 1 sufficient clearance is afforded between the inner and outer bearing members to permit the balls to be introduced in the act of assembling the bearing. If desired, an entrance notch 6 may be provided in one or the other of the rings to afford additional clearance for assembling. When both race-ways have been filled with the desired number of balls, the rings are moved apart to the final operative position shown in Fig. 2, in which position they are positively held in the manner hereinafter described. At the inner edge of each ring member 4—5 there is formed an annular groove, and the bottom of each groove constitutes what I shall term a supporting shoulder or platform, said platforms being indicated respectively at 11—12. Seated in these grooves is what I shall term a spacing member 14. This spacing member is preferably in the form of a split ring, the ends of which are indicated at 15, Fig. 3. This split ring is formed of a suitable hard metal such as iron or steel, such as can be deformed when subjected to heavy pressure. This split ring, which may be made from sheet metal, is first formed so that it is arched outwardly in cross section, as shown in Fig. 1. This arching of the ring reduces the width somewhat so that it may be inserted into the aforesaid grooved portions of the bearing members 4—5 when the same are slightly separated from the position shown in Fig. 1. When the spacer is in place it is then suitably deformed by pressure to flatten it down as shown in Fig. 3. This flattening down of the ring causes the same to widen out and thus hold the ring members 4—5 in a properly spaced relation, as shown in Fig. 2. In the preferred form of the construction I undercut the recesses or grooves in the outer side of each ring member 4 and 5 so that the spacer cannot be removed but will become a permanent part of the bearing. Again, in the preferred form of construction I preferably form at one or more points on the side of the spacer 14 lateral projections 16—16. By this or an equivalent means it is impossible for one ring section 4 or 5 to slip on the spacer 14 and thereby grind the same down so as to loosen the bearing. Inasmuch as the spacer means must necessarily be made of hard metal in order to effectively perform its intended function, it is obvious that it is desirable to provide an adequate support at the inside to resist the pressure necessary to deform the spacer and to transform it from substantially the shape shown in Fig. 1 to the shape shown in Fig. 2. By providing the supporting shoulders or platforms 11 and 12 an adequate support or anvil is formed which will sufficiently resist the pressure or force required to effect the aforesaid transformation. It is obvious that any suitable ball spacing member may be provided in the event it is desired to employ balls of a lesser number than required to fill each race-way. Such ball spacing means are too well known to require illustration. Again, it will be understood that whereas I have elected to show the outer bearing ring made up of two divided sections 4 and 5 for the purpose of permitting the axial movement of said rings toward each other in the assembling of the bearing, it is not essential that I shall select the outer ring for this purpose, as it would require a mere reversal of parts to divide the inner ring instead of the outer ring, and to adapt the spacer 14 thereto.

It will be understood that in Fig. 1 I have shown one of the balls 10 in the position in which it would appear when being inserted into the bearing. In assembling the bearing the balls 9—9 may be freely introduced after shifting the outer ring bodily to the right as viewed in Fig. 1. When a sufficient number of balls 9 have been inserted the outer bearing member is moved to the left to hold the balls 9—9 in place, as shown. The balls 10 are then inserted with entire freedom so long as the ring member 5 is shifted over toward the ring member 4. When all the balls 10 are in place the spacing member is then snapped into place and pressure is applied as aforesaid to expand it laterally to a sufficient extent to hold the ring sections 4—5 in the final operative position indicated in Fig. 2. By properly proportioning the spacer means 14 it is obvious no adjusting means whatever is required to first space the rings 4 and 5 before inserting the member 14. The spreader in its initially arched condition will be seen to be in the nature of a truss or toggle which will act, as the arch is flattened down, like a toggle to spread the members apart to the desired extent.

I am aware that heretofore in a bearing of this general character it has been proposed to introduce soft metal into the space between the two axially displaceable bearing rings, after the same have first been accurately adjusted, for the purpose of sealing the bearing rings in said preadjusted position, the soft metal being heated and introduced in a fused state, but such a construction is open to several objections that my invention avoids. First, should the bearing become overheated, as is not infrequently the case in overloads, the soft metal seal would be liable to become fluid and to run and choke the bearing proper, destroying its efficiency. Again in such a construction great difficulty would be encountered in the manufacture because the soft metal seal when run into the space between the ring sections in a fused state would be liable to run entirely through and lodge on the bearing surfaces proper to the injury thereof. My present invention comprehends the use of a hard, that is to say a non-fusible, metal spacer which overcomes all of the above difficulties. It avoids first the necessity of a separate primary adjusting means for effecting at the outset an accurate adjustment of the rings prior to the flowing in of the seal of soft metal, and second, it avoids the necessity of introducing into the assembled and adjusted bearing a packing to prevent the fusible metal from flowing into the path of the balls. By employing a spacer of hard metal initially proportioned so as to space the rings apart to the desired extent when flattened down, the introduction and deformation of the same, as I have before described, furnishes a permanent spacing for the bearing rings with approximately the proper spacing. It is preferable to use a spacer which when flattened down will tend to cause the races to bear upon the balls with slightly more than the desired force causing the bearing to bind slightly. This binding, if objectionable, may be easily and quickly relieved by simply putting the bearing under a suitable heavy press and applying sufficient pressure to the two ring members to crowd them together sufficiently to allow the balls to run with the desired degree of freedom. It will thus be seen that my improvement possesses many advantages over the prior art and notably over the construction above described which employs a soft metal seal as distinguished from a hard or non-fusible metal spacer. For the above reasons it will be understood that by the term "hard metal" I mean to exclude such metals or alloys as are fusible at a comparatively low temperature such as Babbitt metal or the like.

What I claim is:

1. A ball bearing comprising a channeled member having annular shoulders to provide thrust receiving ball tracks, a pair of bearing members concentrically arranged with respect to said channeled member and having annular ball tracks confronting the ball tracks of said channeled member, said bearing members being displaceable axially toward each other to permit balls to be introduced between confronting ball tracks, two sets of balls between said confronting sets of ball tracks and spreading means for said bearing members comprising a hard metal spreading member permanently secured between the axially displaceable bearing members to hold the same spaced apart to maintain the respective ball tracks thereon in proper operative relation with the confronting ball tracks on the other bearing member, said parts being constructed to enable the insertion and deformation of said spreading member between said axially displaceable bearing members in the act of assembling the bearing.

2. A ball bearing comprising a bearing member provided with two spaced ball races, a coöperating bearing member composed of a plurality of axially displaceable rings each constructed to provide a ball race to a coöperate with one of the ball races on the first mentioned bearing member, two rows of balls in the spaces between coöperating ball races, a non-removable hard metal spacing member between said two rings operating to hold the same at a fixed operative relation to cause the companion ball races to properly engage said two rows of balls and means permanently securing said hard metal spacing member in spacing position between the two rings of the two-part bearing member.

3. In a ball bearing of the double row type, two annular bearing members having two sets of ball races to receive two rows of balls, one of said bearing members comprising two rings axially displaceable to permit of the assembling of the bearing when said rings are brought together, a hard metal deformable spacing device, the two ring bearing member having a recess to receive said spacing member, the bottom of said recess forming a supporting platform for said deformable spacing member.

4. In a ball bearing of the double row type, two annular bearing members having two sets of ball races to receive two rows of balls, one of said bearing members comprising two rings axially displaceable to permit of the assembling of the bearing when said rings are brought together, a hard metal spacing device, the two ring bearing member having a recess to receive said spacing member, the bottom of said recess forming a supporting platform for said spacing member, the opposite edges of said recess being undercut, said spacing member projecting into said undercut portions.

5. In a ball bearing of the double row type, two annular bearing members having two sets of ball races to receive two rows of balls, one of said bearing members comprising two rings axially displaceable to permit of the assembling of the bearing when said rings are brought together, a hard metal spacing device, the two ring bearing member having a recess to receive said spacing member, the bottom of said recess forming a supporting platform for said spacing member, the opposite edges of said recess being undercut, said spacing member projecting into said undercut portions and means for preventing the independent rotation of said rings.

6. In a ball bearing of the double row type, two annular bearing members having two sets of ball races to receive two rows of balls, one of said bearing members comprising two rings axially displaceable to permit of the assembling of the bearing when said rings are brought together, a hard metal spacing device, the two ring bearing member having a recess to receive said spacing member, the bottom of said recess forming a supporting platform for said spacing member, the opposite edges of said recess being undercut, said spacing member projecting into said undercut portions and means for preventing the independent rotation of said rings, said means being formed integrally with said spacing member.

7. In a ball bearing of the double row type, two annular bearing members having two sets of ball races to receive two rows of balls, one of said bearing members comprising two rings axially displaceable to permit of the assembling of the bearing when said rings are brought together, a hard metal spacing device, the two ring bearing member having a recess to receive said spacing member, the bottom of said recess forming a supporting platform for said spacing member, the opposite edges of said recess being undercut, said spacing member projecting into said undercut portions, and means for preventing the independent rotation of said rings, said means being formed integrally with said spacing member and comprising opposite projections on said spacing member arranged to project into corresponding recesses in said ring members.

8. A ball bearing comprising a bearing member provided with two spaced apart ball races, a coöperating bearing member composed of concentrically arranged bearing rings having ball races for coöperation with the ball races on the first bearing member, said bearing rings being displaceable axially toward each other to admit balls into one of the ball races described, and a deformable initially arched spreading member engaged while in arched condition between the adjoining bearing rings and flattened down to thereby spread apart the ball race rings to a predetermined extent.

9. The herein described process which comprises approaching ball race rings of a two-part bearing member to thereby open up the ball race between one of said rings and the ball race track on a coöperating bearing member, introducing the balls into said opened race way, introducing an arched deformable spreader between the two ball race rings and then flattening down the arched portion of said spreading member to thereby force the ball race rings apart a predetermined extent.

10. The herein described process which comprises approaching ball race rings of a two-part bearing member to thereby open up the ball race between one of said rings and the ball race track on a coöperating bearing member, introducing the balls into said opened race way, introducing an arched deformable spreader between the two ball race rings, then flattening down the arched portion of said spreading member to thereby force the ball race rings apart a predetermined extent and then forcing the two ring members toward each other to relieve them of undue pressure on the balls.

11. In a bearing of the character set forth, a channeled bearing member having ball tracks at the opposite sides of the channel therein, a coöperating bearing member comprising concentrically disposed ring members having ball tracks confronting the ball tracks on the first bearing member and displaceable axially toward each other to admit a row of balls between one set of confronting ball tracks, two rows of balls engaged between the sets of confronting ball sets and a sheet metal spreader of transversely arched configuration for engagement between the axially displaceable bearing rings.

CARL A. CARLSON.